Nov. 5, 1946.   C. D. JENCKS   2,410,584
ADJUSTABLE SUPPORT FOR BIFOCAL LENSES
Filed Feb. 19, 1944

INVENTOR
Charles D. Jencks.
BY
Kenway & Witter. Attys.

Patented Nov. 5, 1946

2,410,584

UNITED STATES PATENT OFFICE 2,410,584

ADJUSTABLE SUPPORT FOR BIFOCAL LENSES

Charles D. Jencks, Bristol, R. I.

Application February 19, 1944, Serial No. 523,042

7 Claims. (Cl. 88—51)

This invention relates to ophthalmic mountings and consists in an improved mounting or support for use with bifocal lenses.

Many attempts have been made heretofore to provide ophthalmic mountings whereby bifocal lenses may be supported in either raised or lowered position before the eyes, so that when unobstructed distant vision is required the reading section of the lenses may be normally located below the line of vision, and when correct reading vision is desired the reading section may be raised to a normal position of use in direct line with the eyes. A wide, correct and unobstructed field of vision may be thus selectively obtained through either section of the lenses. In these previous contructions, a nose bridge has been provided which is arranged to be shifted into either of two positions so as to bring either the reading section or the distant section of the lenses opposite the eyes of the wearer, but these have the objection that it has been generally necessary to remove the glasses from the face in order to adjust the bridge to bring the other lens section into operative position. These mountings, moreover, have been heretofore an integral part of the spectacles rather than an attachment applicable to any spectacles, thereby making the resultant benefits beyond the range of many who could not afford complete new spectacles but who could afford an inexpensive attachment producing the same and more simplified results.

With these considerations in view the present invention consists in a novel mounting or support which includes an auxiliary nose rest resiliently mounted on the bridge by means holding it normally in an operative position beneath the bridge where it supports the glasses in elevated position. The auxiliary rest is however arranged to swing outwardly in a yielding manner from its operative position under light pressure when the wearer wishes to bring the distant section of the lenses into operative position. This construction permits the wearer to shift his glasses from one position to another by the merest touch, a slight lifting of the glasses bringing the rest automatically into operative position for holding the reading sections in correct elevated position, and a slight downward pressure displacing the auxiliary rest and bringing the distant sections into position.

Preferably and as herein shown, the auxiliary rest may be formed of resilient wire connected to the bridge, or to a bridge-engaging member, through a coil permitting pivotal movement of the rest. The rest includes downwardly extending legs and a transverse nose-engaging portion. In its operative position this transverse portion is disposed directly under the bridge but its angle with the nose of the wearer is such that downward pressure applied anywhere to the glasses causes the rest to swing outwardly and forwardly, thus permitting the usual bridge pads to take over their function of supporting the glasses in lowered position.

The features and advantages of the invention will be best understood and appreciated from the following detailed description of a preferred embodiment thereof selected for purposes of illustration and shown in the accompanying drawing in which.

Figure 1:
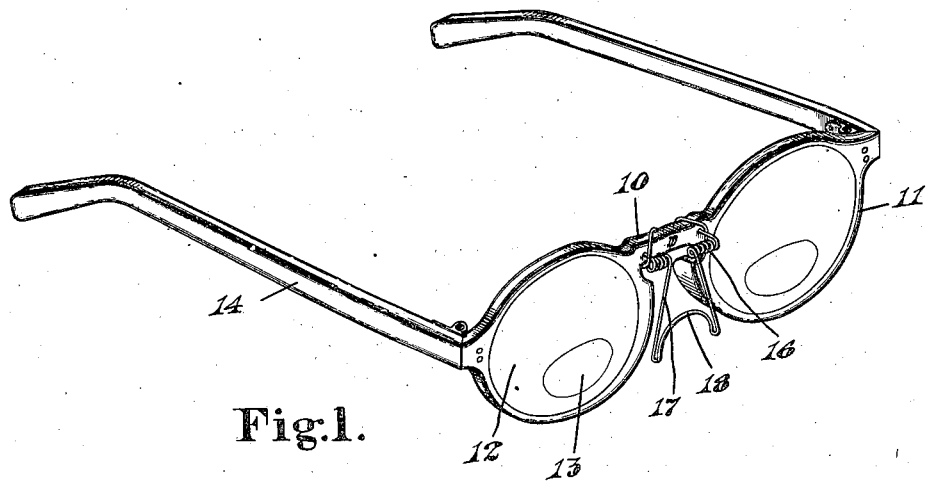
Fig. 1 is a view in perspective of spectacles fitted with the auxiliary rest.

My invention is herein illustrated in its application to bifocal spectacles having a frame comprising a nose bridge 10 bowed slightly upwardly and forwardly and substantially rectangular in cross section. The bridge connects similar lens frames 11 containing bifocal lenses 12 in which the close-up or reading sections 13 are shown in outline. The usual temples 14 are hinged to the outer ends of the lens frames 11 and the usual nose pads 15 are formed integral with the inner ends of the frames. The construction above described is conventional and selected only for purposes of illustration. The invention may be applied to spectacles of any other commercial design.

Figures 2, 3:
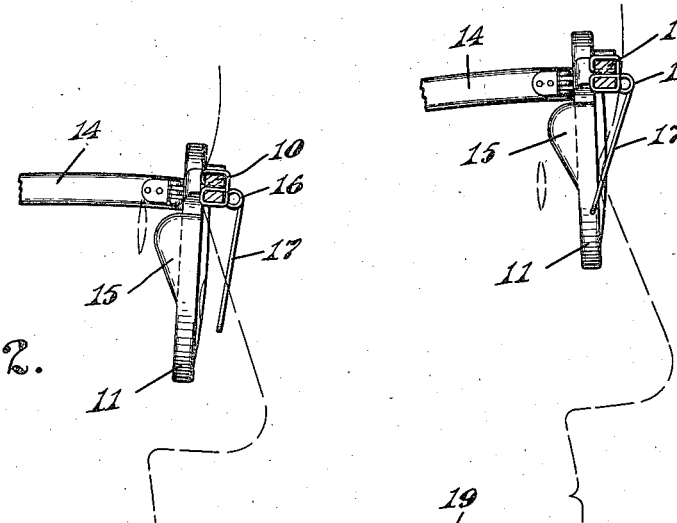
Figs. 2 and 3 are views showing the bridge in section and the left lens of the spectacle in position upon the face of the wearer.

The auxiliary nose rest is formed of a single length of resilient wire and is mounted upon the nose bridge 10. As herein shown it comprises two coils 16 disposed in alignment with each other and secured to the bridge by having the wire at the outer end of each coil passed rearwardly through a small hole provided for that purpose in the bridge. The wire is then brought forwardly under the bridge, bent upwardly, rearwardly over the bridge and inwardly to a position behind the bridge, and finally anchored by being passed forwardly through a small hole provided at substantially the center of the bridge. From the inner end of each coil a leg 17 extends downwardly and the legs are connected at their lower ends by a concave transverse portion 18 shaped to span the nose. The legs 17 diverge downwardly to some extent so that they may pass on either side of the wearer's nose. The coils 16 are so shaped and set or biased that the lower ends of the legs 17 and the transverse concaved portion 18 stand naturally vertically beneath the bridge 10 as indicated in Fig. 3. This initial vertical position is resiliently maintained by the auxiliary rest with sufficient stiffness to support the spectacles independently of the nose pads 15, all as indicated in Fig. 3. In this position the reading sections 13 of the spectacle lenses are located directly opposite the eyes of the wearer. However, the resiliency of the auxiliary rest is such that by a slight downward pressure on the bridge 10 or the frame the rest will slip downwardly on the nose of the wearer and at the same time swing outwardly into the position indicated in Fig. 2 in which the distant sections of the lenses are located directly opposite the eyes of the wearer and the reading sections are displaced out of the direct line of vision. Thus the wearer may change from one position to another by merely locating the spectacles in the desired position and the auxiliary rest will act consistently with such positioning. That is to say, if the user elevates his glasses the auxiliary rest automatically assumes the function of supporting them, whereas if the wearer lowers his glasses the auxiliary rest is caused to move yieldingly out of operative position by a sort of camming reaction with the inclined surface of the nose and permits the glasses to be supported in a lower position by its nose guards.

Figure 4:
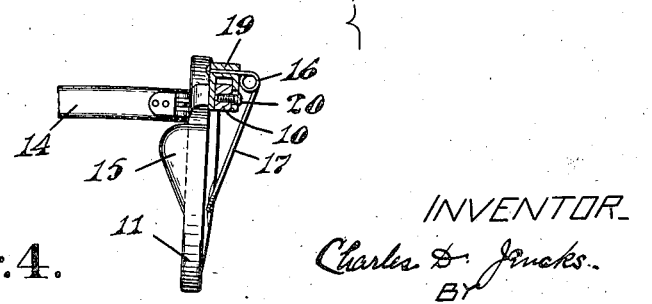
Fig. 4 is a similar view showing an auxiliary rest in the form of a removable unit.

In Fig. 4 is illustrated a modification in which the auxiliary rest 16—17 is shown as mounted on an adjustable block 19 instead of directly on the bridge 10. In this construction the block 19 is arranged to straddle the bridge and is provided with a vertical slot in its front wall through which extends a clamping screw 20. By raising or lowering the block 19 with respect to the bridge 10 a preliminary adjustment may be effected which will bring the auxiliary rest into the exact vertical position required for positioning the reading section opposite the eyes of the wearer.

The embodiment of my invention illustrated in Fig. 4 is of particular value in that it comprises a unitary self-contained attachment which may be manufactured as a complete article and sold to all wearers of bifocal glasses at moderate expense. The forked or slotted block 19 constitutes a bridge-engaging carrier for the auxiliary rest. This carrier may be slipped over the bridge of any glasses and secured in place with exactly the proper adjustment required by the individual wearer. While the clamping screw 20 is shown herein as threaded into the bridge, the block itself may well serve as a clamping member so that no modification of the spectacle structure will be required in securing the attachment in place.

Having thus disclosed my invention and described in detail illustrative embodiments thereof, I claim as new and desire to secure by Letters Patent:

1. A spectacle or eyeglass structure including a bridge, nose-pieces and bifocal lenses united in conventional predetermined relation, an auxiliary nose rest mounted on the bridge adjacent to the nose pieces, and spring means connected to said auxiliary rest for holding it beneath the bridge while permitting it to swing outwardly under light pressure, the movement of the rest from one position to the other resulting in vertical adjustment of the structure supporting the bifocal lenses.

2. A spectacle or eyeglass structure including a bridge, nose-pieces and bifocal lenses assembled in conventional predetermined relation, an auxiliary nose rest mounted on the bridge, and spring means combined with said auxiliary rest for holding it in an initial position substantially between said lenses in which it supports the said structure in an elevated position, said means permitting the rest to swing to a forwardly inclined position in which the nose-pieces support the structure in a lower position.

3. A spectacle or eyeglass structure including a bridge and bifocal lenses assembled in conventional predetermined relation, and a nose rest of resilient wire including in its structure a substantially horizontal coil which is secured to the bridge, arms extending downwardly from the coil, and a concave connecting portion shaped to span the nose, the said coil being biased normally to locate the concave connecting portion beneath the bridge.

4. A spectacle or eyeglass structure including a bridge and bifocal lenses assembled in conventional predetermined relation, and a nose rest of resilient wire including in its structure a pair of coils which are connected to the bridge and disposed in substantially parallel relation thereto, spaced arms extending downwardly from the ends of the coils and normally maintained by said coils substantially in the plane of said lenses, and a concave portion connecting the lower ends of said arms and being shaped to span the nose of the wearer, the said coils permitting the auxiliary rest to swing outwardly when the structure is pressed downwardly by the wearer.

5. A spectacle or eyeglass structure including a bridge and bifocal lenses assembled in conventional predetermined relation, and a nose rest connected to the said structure and shaped to support the lenses in an elevated position and comprising a movable concave nose-spanning portion, resilient means for holding said concave portion initially at a fixed distance from the bridge and for limiting inward movement substantially to the plane of said lenses, thereby supporting the structure in one position while permitting the concave portion of the auxiliary rest to move outwardly in a yielding manner and free the structure for movement to a lower position when the structure is subjected to downward pressure.

6. A pair of spectacles comprising a bridge supporting bifocal lenses in fixed predetermined relation and nose pieces, a supporting member detachably mounted on the bridge and having a nose-engaging portion, and resilient means for maintaining the said nose-engaging portion in an initial position beneath the bridge supporting the lenses in an elevated position on the face, the said resilient means, when the bridge is pressed downwardly, permitting the nose-engaging portion to move yieldingly from its initial operative position beneath the bridge to an inoperative position disposed forwardly and downwardly with respect to the bridge, thereby permitting the lenses to be supported by the said nose pieces in a lower position on the face.

7. A detachable attachment for spectacles having bifocal lenses, comprising a bridge-engaging member adapted to be clamped to the bridge of spectacles, a nose rest having a connection with said member, said rest having elongated legs connected by a transverse element shaped to span the nose of the wearer, and means for swinging the nose rest resiliently and automatically and inwardly toward the face of the wearer into operative position beneath said bridge-engaging member, thereby supporting the lenses in an elevated position on the face and being displaceable under light pressure to permit the lenses to assume a lower position on the face.

CHARLES D. JENCKS.